April 6, 1948.  H. DURAT  2,438,994
VALVE GRINDING MACHINE
Filed Jan. 2, 1946  2 Sheets-Sheet 1

INVENTOR.
Hector Durat
BY Victor J. Evans & Co.
ATTORNEYS

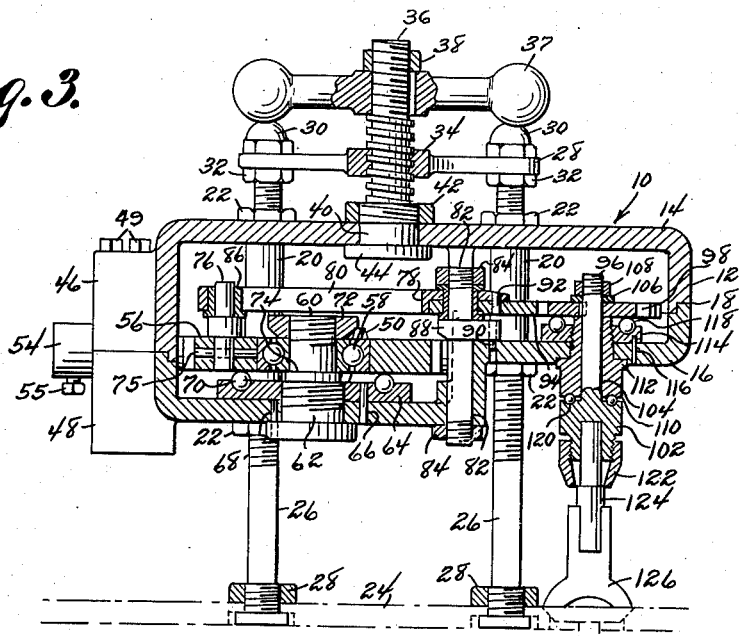

Patented Apr. 6, 1948

2,438,994

UNITED STATES PATENT OFFICE 2,438,994

VALVE GRINDING MACHINE

Hector Durat, Corona, Long Island, N. Y.

Application January 2, 1946, Serial No. 638,656

3 Claims. (Cl. 51—29)

This invention relates to a valve grinding apparatus.

The principal object of the invention is to provide a device that will grind and lap the valves and valve seats in the cylinder blocks of internal combustion engines having any number of cylinders.

The device can be used without disconnecting the tappets from the valve stem but in this instance the camshaft must be rotated as the grinding progresses to seat the valves in their respective valve seats.

Another object of the invention is to provide a device that is simple in construction and operation, inexpensive to manufacture and can be sold at a reasonable price.

With the above and other objects and advantages in view the invention consists of the novel details of construction, arrangement and combination of parts. More fully hereinafter described, claimed and illustrated in the accompanying drawings in which:

Figure 3 is a sectional view on the line 3—3 of Figure 1 and

Figure 4 is a sectional view on the line 4—4 of Figure 1.

Figure 1:
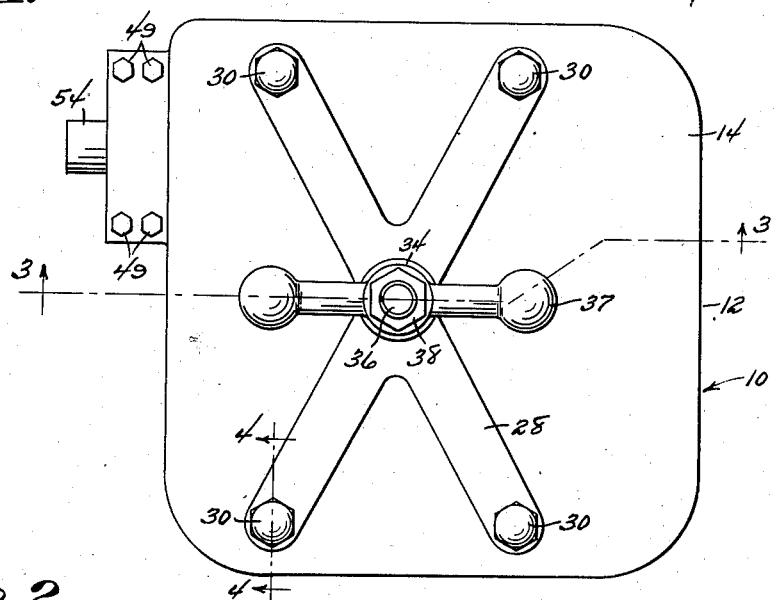
Figure 1 is a top plan view of an embodiment of the invention.
Figure 2:
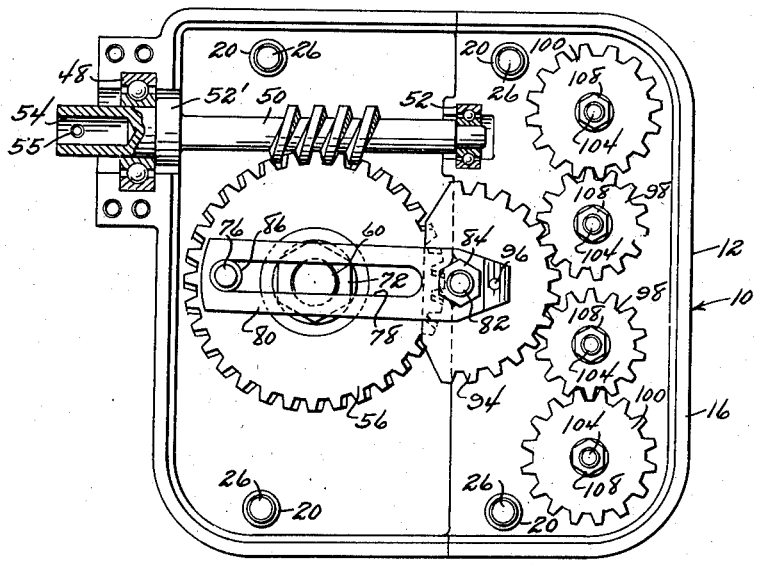
Figure 2 is a plan view thereof partly in section with the upper section of the housing removed.

Referring more in detail to the drawing the reference numeral 10 designates the grinder generally which comprises the housing 12 which consists of upper section 14 and lower section 16 which are mortised along their marginal rim as at 18.

The sections are joined in mating relation to each other by means of the tubular connections or guides 20, the ends of which are threaded to receive the nuts 22 which when tightened retain the section as a unit.

The grinder 10 can be mounted on the cylinder block of an internal combustion engine in either of two ways.

The stud bolts for retaining the head in position may be utilized or a plate 24 may be provided with bolts 26, having nuts 28 thereon to retain the bolts in fixed relation to the plate and the plate will be apertured to correspond to the stud bolts of the engine.

In either manner of mounting the guides 20 are positioned on the bolts and the guides are of such diameter as to permit for movement of the guides on the bolts.

A spider 28 is secured to the bolts by means of cap nuts 30 and machine nuts 32, and when tightened the spider is retained in fixed relation to the bolts.

At the center of the spider an internally threaded guide or bearing 34 is provided to receive the jack screw 36 which is provided with a handle 37 retained thereon by a nut 38.

The lower end of the screw 36 is rotatably mounted in the upper section of the housing in a bearing 40 retained in the housing by a nut 42, and the end of the screw is provided with a head 44 positioned at the lower end of the bearing thus when the screw 36 is rotated the housing is moved up and down away from or toward the cylinder block.

The sections are provided with the bearing sections 46 and 48 respectively secured together by bolts 49 in which is mounted by means of the ball race 48', the worm 50, the other end being journalled in the ball race 52 in the housing, a shoulder 52' on the worm retains the worm in position and the free end of the worm is provided with a socket 54 having a set screw 55 to which power is applied which may be a direct drive from an electric motor or the connector end of a flexible shaft connected to a source of power.

The worm meshes with the gear 56 which is rotatably mounted by means of a ball race 58 on the bearing pin 60 having a head 62 thereon which contacts the lower surface of the housing and retains the pin 60 in position when the plate 64 is screwed therein. The plate 64 being fixed to the housing by a pin 66 and the pin 60 by a pin 68 thus the plate 64 and pin 60 are fixed in immovable relation to the housing. Balls 70 are provided for the gear 56 to rotate thereon, and a nut 72 retains the ball race 58 in contact with the shoulder 74 on the pin 60.

Secured in the gear 56 by means of the key 75 is an eccentrically positioned wrist pin 76 loosely engaged in an elongated slot 78, provided in a rocking arm 80 pivotally mounted on the shaft 82 fixed to the upper and lower sections of the housing by nuts 84. A bearing 86 is positioned on the wrist pin 76 and a shoulder 88 on the shaft 82 fixed to the housing by a key 90 supports a bearing 92 on which the segment 94 is movably mounted. The arm 80 is fixed to the segment 94 by the key 96.

The segment 94 meshes with the gears 98 which in turn mesh with the gears 100 and each gear is provided with a chuck 102 having a spindle 104 receivable in the gears and fixed thereto by a washer 106 and nut 108. The spindle 104 of the chuck is movably mounted in a bearing 110, having a shoulder 112 which retains the bearing in place when a plate 114 is threaded thereon internally of the housing and retained in fixed relation to the housing by a key 116. Balls 118 in the plate 114 provide anti-friction support for the gears. Balls 120 provide anti-friction support between the chuck 102 and bearing 110. The chuck is provided with the conventional connection 122 to receive and retain therein the stem 124 of the valve wrench 126 which may be in the form of a rubber vacuum cap or any desired type of wrench to fit in the slots in the valve.

In operation the grinder is mounted on the block as previously described, power is attached to the worm drive and rotation of the gear 56 imparts oscillatory motion to the gears by means of the wrist pin and rocking arm to grind the valves, the device being susceptible of working on one or more valves as desired.

The proper relation of the housing to the block is obtained by means of the jack screw 36 which may adjust the housing toward or away from the block as desired.

It is believed that the operation and construction of the device will be apparent to those skilled in the art and it is to be understood that changes in the details of construction, arrangement and combination of parts may be resorted to without departing from the spirit of the invention or the scope of the appended claims.

Having thus described the invention what is claimed as new and desired to be secured by Letters Patent is:

1. A portable valve grinding machine comprising a gear housing, a plurality of studs by which the housing is mounted on an engine block, means clamping the housing in position through the studs, a plurality of pairs of spaced parallel spindles carrying valve attaching tool holding chucks rotatably mounted in said housing, gears fixedly mounted on said spindles with the gears of each pair of spindles in meshing relation, a gear segment in the housing meshing with one of the gears of each of the pairs of spindles, a shaft pivotally mounting the gear segment in the housing, an arm with an elongated slot therein fixedly attached to the gear segment and extending therefrom, a worm gear having a pin eccentrically mounted thereon rotatably mounted in the housing with the pin positioned in the slot of the arm of the gear segment, a worm positioned in the housing meshing with the said worm gear, and a shaft having an actuating connection at the outer end rotatably mounting the said worm in the housing.

2. A portable valve grinding machine comprising a gear housing, a plurality of studs for mounting the housing on an engine block, a spider having an arm extending to each stud, a clamp screw actuating the spider for clamping the housing in operative position in relation to valves of the engine block through the studs, a plurality of pairs of spaced parallel spindles carrying valve attaching tool holding chucks rotatably mounted in said housing, gears fixedly mounted on said spindles with the gears of each pair of spindles in meshing relation, a gear segment in the housing meshing with one of the gears of each of the pairs of spindles, a shaft pivotally mounting the gear segment in the housing, an arm with an elongated slot therein fixedly attached to the gear segment and extending therefrom, a worm gear having a pin eccentrically mounted thereon rotatably mounted in the housing with the pin positioned in the slot of the arm of the gear segment, a worm positioned in the housing meshing with the said worm gear, and a shaft having an actuating connection at the outer end rotatably mounting the said worm gear in the housing.

3. In a portable valve grinding machine, the combination, which comprises, a gear housing, a plurality of studs by which the housing is mounted on an engine block, means clamping the housing in position through the studs, means adjusting the position of the housing on the studs, a plurality of pairs of spaced parallel spindles carrying valve attaching tool holding chucks rotatably mounted in said housing, gears fixedly mounted on said spindles with the gears of each pair of spindles in meshing relation, a gear segment in the housing meshing with one of the gears of each of the pairs of spindles, a shaft pivotally mounting the gear segment in the housing, said gear segment having an arm with a slot therein extending therefrom, a worm gear having a pin eccentrically positioned thereon rotatably mounted in the housing with the pin positioned in the slot of arm extending from the gear segment, a worm positioned in the housing meshing with the said worm gear, means rotatably mounting the worm in the housing, and means through which the worm may be rotated from the exterior of the housing.

HECTOR DURAT.

REFERENCES CITED

The following references are of record in the file of this patent:

UNITED STATES PATENTS

| Number | Name | Date |
| --- | --- | --- |
| 748,339 | Bartrug | Dec. 29, 1903 |
| 930,472 | Harding | Aug. 10, 1909 |
| 1,122,998 | Peterson | Dec. 29, 1914 |
| 1,158,796 | Forster | Nov. 2, 1915 |
| 1,201,354 | Sargent | Oct. 17, 1916 |
| 1,382,934 | Schadee | June 28, 1921 |
| 1,400,000 | Richard | Dec. 13, 1921 |
| 1,490,819 | Greenfield | Apr. 15, 1924 |
| 1,699,475 | Miller | Jan. 15, 1929 |